(12) United States Patent
Loukusa et al.

(10) Patent No.: US 9,001,259 B2
(45) Date of Patent: Apr. 7, 2015

(54) FOCUS ASSEMBLY FOR CAMERA

(71) Applicant: Fluke Corporation, Everett, WA (US)

(72) Inventors: Michael E. Loukusa, Buffalo, MN (US); Justin M. Sheard, Rogers, MN (US); Brian R. Gattman, Minneapolis, MN (US)

(73) Assignee: Fluke Corporation, Everett, WA (US)

(*) Notice: Subject to any disclaimer, the term of this patent is extended or adjusted under 35 U.S.C. 154(b) by 2 days.

(21) Appl. No.: 13/836,947

(22) Filed: Mar. 15, 2013

(65) Prior Publication Data

US 2014/0267879 A1   Sep. 18, 2014

(51) Int. Cl.
| | | |
|---|---|---|
| G03B 13/00 | (2006.01) | |
| H04N 5/232 | (2006.01) | |
| G03B 17/18 | (2006.01) | |
| G03B 3/02 | (2006.01) | |
| G03B 3/04 | (2006.01) | |
| G03B 3/10 | (2006.01) | |
| G02B 7/04 | (2006.01) | |

(52) U.S. Cl.
CPC  G03B 17/18 (2013.01); G03B 3/02 (2013.01); G03B 3/04 (2013.01); G03B 3/10 (2013.01); G02B 7/04 (2013.01)

(58) Field of Classification Search
CPC . H04N 5/23212; H04N 5/23293; G03B 13/36
USPC .................................................. 348/345, 347
See application file for complete search history.

(56) References Cited

U.S. PATENT DOCUMENTS

| | | | | |
|---|---|---|---|---|
| 4,160,590 | A * | 7/1979 | Reynard | 396/103 |
| 4,687,314 | A * | 8/1987 | Raschke | 396/132 |
| 2003/0011692 | A1* | 1/2003 | Shore et al. | 348/240.3 |
| 2003/0107821 | A1 | 6/2003 | Nakamura | |
| 2010/0091392 | A1* | 4/2010 | Jung et al. | 359/824 |
| 2010/0259669 | A1 | 10/2010 | Wood | |
| 2010/0270469 | A1* | 10/2010 | Johnson et al. | 250/330 |
| 2012/0224067 | A1* | 9/2012 | Stuart et al. | 348/164 |
| 2012/0243856 | A1* | 9/2012 | Shibuno | 396/76 |

FOREIGN PATENT DOCUMENTS

JP       2005084259       3/2005

OTHER PUBLICATIONS

Partial International Search for International Application No. PCT/US2014/026246, Aug. 5, 2014, 3 pages.
International Search Report and Written Opinion for International Application No. PCT/US2014/026246, Nov. 5, 2014, 13 pages.

* cited by examiner

*Primary Examiner* — Gevell Selby
(74) *Attorney, Agent, or Firm* — Fredrikson & Byron, P.A.

(57) ABSTRACT

A method and apparatus for adjusting the focus of a camera. A rotatable focus member, when rotated, effects movement of an indicator element. The position of the indicator element is sensed by a sensing element and is passed to a controller within the camera. The controller prompts a motor to drive a focusing element of the camera in response to changes in the sensed position of the indicator element. The focus member effects movement of the indicator element by way of rolling resistance as opposed to sliding friction, allowing for more consistent and controlled manipulation.

30 Claims, 6 Drawing Sheets

FOCUS ASSEMBLY FOR CAMERA

BACKGROUND

Focusing assemblies for cameras are known in the art, including both mechanical and electromechanical arrangements. Mechanically focused cameras are often adjusted by rotating a focus ring on an objective. This rotation is mechanically converted into a displacement of a focusing lens within the camera, adjusting the focal point thereof. Cameras may also employ electromechanical means to displace a lens for focusing. Such cameras may use a servomotor to drive the lens in response to an input, such as a switch. Servomotor systems, however, separate the user from direct control over focusing, and may result in a less intuitive and more difficult focusing task.

In an attempt to create a more controlled, intuitive focusing design, cameras have been modified to utilize a servo-type system that responds to a manual input. However, these manual inputs often lack the true feel of a manual focusing arrangement. They may still be difficult to use in that manual manipulation of an input element may not provide an adequate degree of control over the input element. For example, a rotatable ring that serves as an input element to a servo system does not need to physically translate a lens as in a traditional mechanical arrangement. Thus, the ring may be too easily rotatable for precise control. Attempts to implement a resistive force to the input device to increase control have resulted in an undesirable discrepancy between the static friction necessary to overcome to initially manipulate the ring and the dynamic friction to overcome while manipulating it. This leads to inconsistent control and feel, and makes small adjustments very difficult.

Additionally, it is often desired to protect the inner elements of the camera from the environment external thereto, and some sort of seal or wall is implemented into the camera to help do so. However, with the adjustability of the lens, there are often components of the camera that are manipulated from the outside of the camera in order to move components inside of the camera. Such moving components make a sealed enclosure difficult and/or costly to achieve.

SUMMARY

Certain embodiment of the present invention relate generally to methods and devices for controlling the focus of a camera. A focus wheel assembly may comprise a base portion for coupling to a camera, and a focus member, rotatable about the base portion and which frictionally engages to engagement members such as O-rings. The engagement is such that rotating the focus member causes the engagement members to rotate as well.

The engagement members may additionally engage attachment members, which extend through the base portion. In some embodiments, the engagement members are coupled to the attachment members so that, when rotated, the engagement members cause the attachment members to rotate as well. At least one attachment member may comprise an indicator element disposed thereon.

Embodiments of the camera may comprise a sensing element, adapted to sense signals from the indicator element, such as its rotational position, for example. Thus, as the focus member is rotated, the engagement member, attachment member, and indicator element may all rotate as well, with the rotational position of the indicator element being sensed by the sensing element. In some embodiments, the indicator and sensing elements may comprise a magnet and an encoder adapted to read magnetic signals, respectively. Alternative embodiments include an optical indicator and sensor.

In some embodiments, the camera comprises a PID controller, which may receive the position signals from the sensing element over time. The PID may send signals to a motor based upon the position signals, the motor adapted to adjust the position of at least one component of the camera to affect its focus. Such components may include a focal lens or a light sensor. Thus, the rotation of the focus member may effect a change in focus of the camera. Additionally, the focus member may be much larger than the engagement member, amounting to a large gear ratio between the two. Accordingly, a small rotation of the focus member may result in a large movement of the indicator element, resulting in a large signal to the sensing element and increasing the signal-to-noise ratio.

The rotational configuration of the components of the focus wheel assembly may allow for smooth, precise, consistent operation for a user. As opposed to the transitions between static and dynamic friction in arrangements comprising components that slide along one another, the rotational configuration may be arranged to comprise little difference in the resistance of initiating and maintaining rotation of the focus member. This may be done, for example, by arranging the components in the focus wheel assembly such that the force necessary to overcome the rolling resistance of various components (which is relatively constant despite initiating or maintaining movement) is much larger than any static or dynamic friction experienced by sliding components, and thus is the dominant resistance experienced by a user.

BRIEF DESCRIPTION OF THE DRAWINGS

FIG. 2b is an exploded view of the focus wheel assembly of FIG. 2a.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. In the following description, where applicable, like reference numbers will be used for like components. It should be appreciated that components of the invention may vary among embodiments of the invention while remaining functionally similar. In such cases, like reference numbers may also be used.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor or focal plane array and/or a visible light optics to focus the visible light on a visible light sensor or focal plane array. In general, a light sensor may refer to a visible light or an infrared sensor.

Figure 1A:
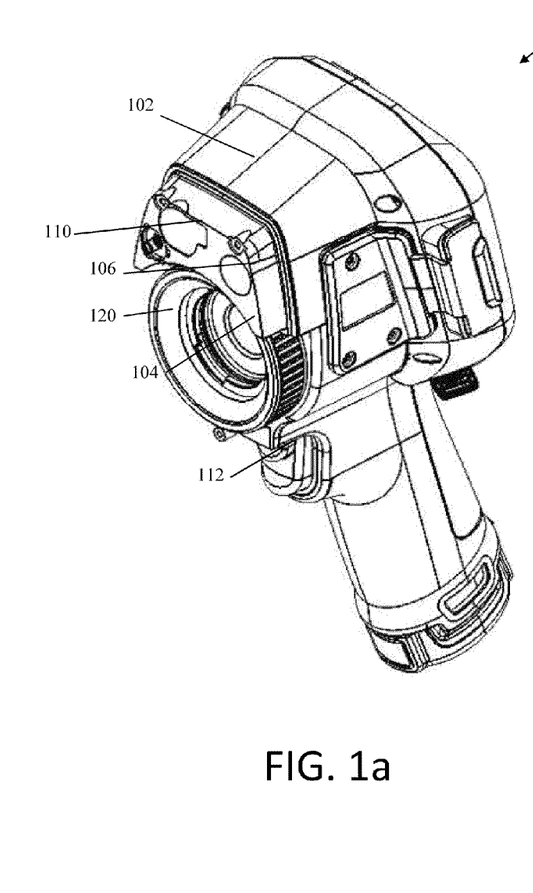
FIG. 1a is a front perspective view of an example thermal imaging camera.
Figure 1B:
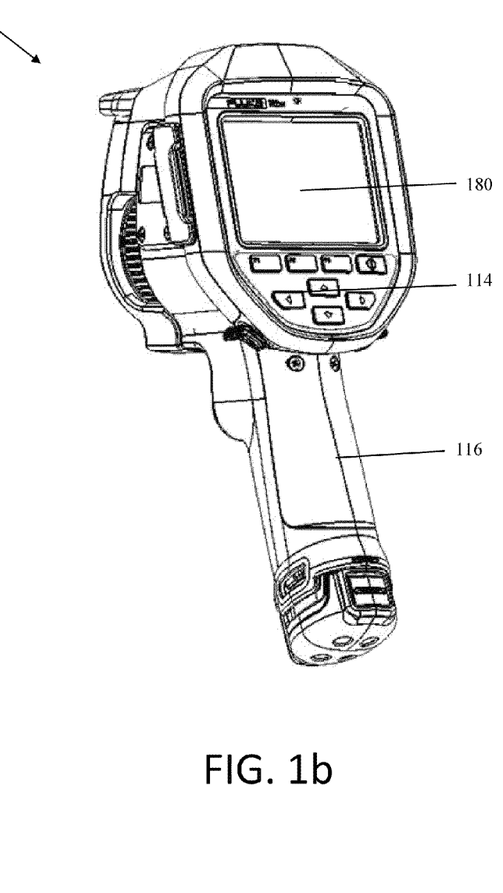
FIG. 1b is a rear perspective view of an example thermal imaging camera.

FIGS. 1a and 1b show front and rear perspective views of an example thermal imaging camera 100, respectively. The camera comprises a housing 102, an infrared lens assembly 104, a visible light lens assembly 106, a display 108, a laser range finder 110, and a trigger control 112. Housing 102 houses the various components of thermal imaging camera 100. The bottom portion of thermal imaging camera 100 includes a carrying handle 116 for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. The visible light and/or infrared sensors, as well as elements of the infrared and/or visible light lens assemblies, may be positionable in order to adjust the focal plane of the corresponding radiation. In some embodiments, the camera 100 may comprise a motor configured to position a focusing device such as a lens. In alternative embodiments, the motor may instead be configured to position the light sensor or focal plane array in addition or alternatively to moving the lens. In certain embodiments, the motor may comprise a servo motor, a piezoelectric motor, or others known in the art.

Thermal imaging camera 100 captures the visible light image and/or the infrared image in response to depressing trigger control 112. In addition, thermal imaging camera 100 controls a display to display the infrared image and the visible light image generated by the camera, e.g., to help an operator thermally inspect a scene. Thermal imaging camera 100 may also include a focus wheel assembly 220 coupled to the infrared lens assembly 104 that is configured to move at least one lens of the infrared lens assembly so as to adjust the focus of an infrared image generated by the thermal imaging camera. A user interface 114 may also be included to allow the user to select or adjust parameters or interact with the camera in other ways.

Figure 2A:
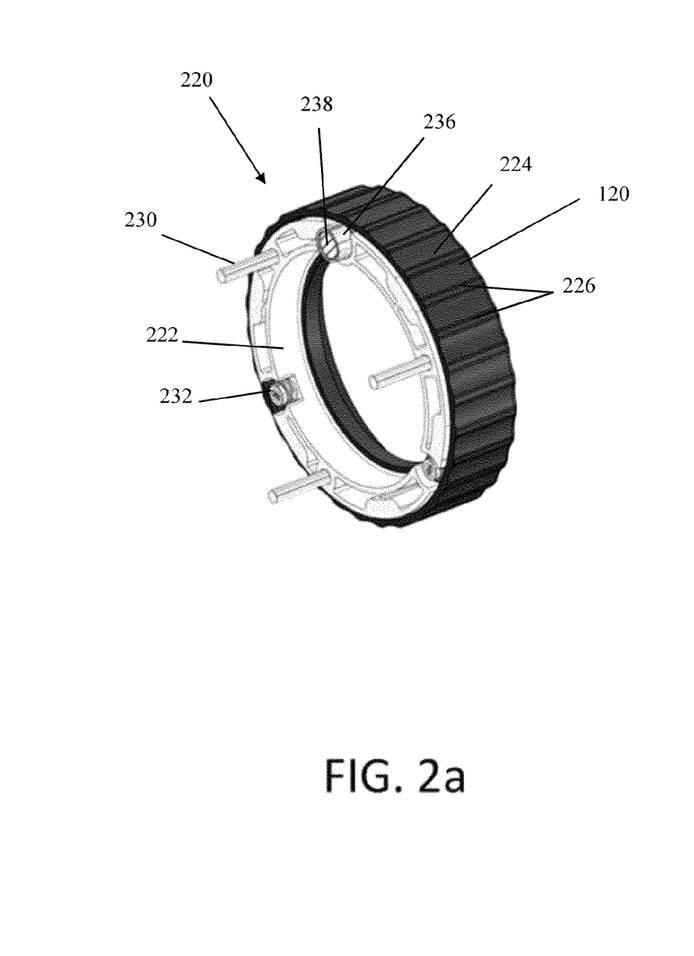
FIG. 2a is a rear perspective view of an embodiment of a focus wheel assembly of the present invention.
Figure 2B:
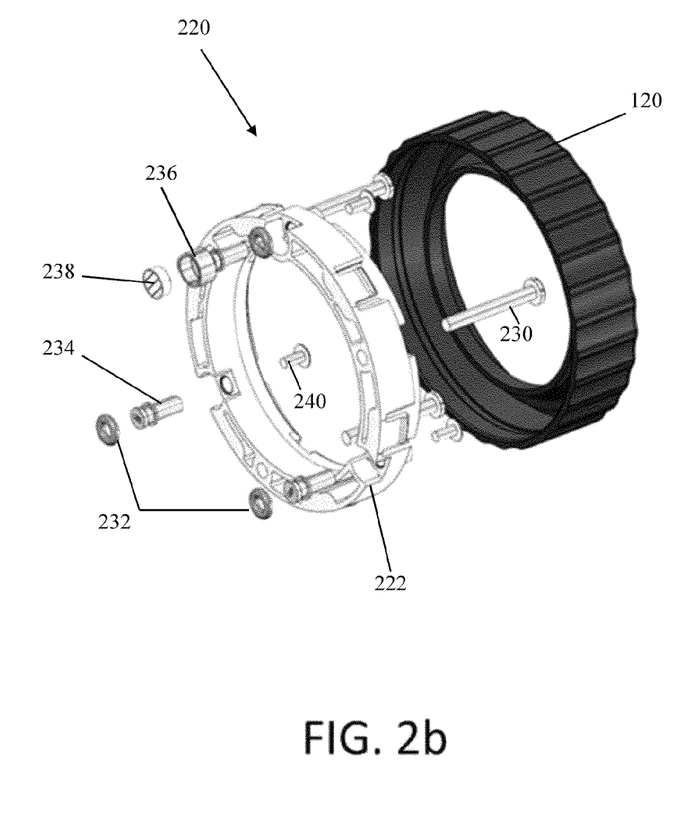

FIGS. 2a and 2b are rear perspective views of an embodiment of a focus wheel assembly of the present invention. FIG. 2a shows an embodiment of a focus wheel assembly 220 comprising a base portion 222, through which fasteners 230 extend for securing the assembly 220 to a camera such as that of FIG. 1. A focusing element, such as focusing wheel 120, engages the base portion 222 and is free to rotate thereabout, while the base portion 222 remains stationary relative to the camera. According to some embodiments, the focusing wheel 120 may be substantially round and comprise a grip 224 for facilitating rotation by a user. The grip comprises ridges 226 enabling a user to effectively grip the focusing wheel 120 for rotation and adjustment. The grip 224 may alternatively comprise other surface textures or materials to facilitate manipulation by a user as well. While shown here and described through much of the disclosure as a wheel, the focusing element may, alternatively, be shaped in other ways while still allowing user adjustment.

The assembly 220 further comprises engagement members, such as O-rings 232, which engage the focusing wheel 120, a magnet holder 236, and a magnet 238, shown in a crosshatched pattern. As will be detailed below, in some embodiments, the magnet holder 236 may be configured to rotate about its central, longitudinal axis in response to the focusing wheel 120 rotating about the base portion 222. Engagement members are shown here and described through much of the disclosure as O-rings 232, though it should be appreciated that suitable alternatives such as gears or sprockets may be used and are within the scope of the present invention. More generally, the focusing element may be configured to better engage particular engagement members. For example, the focusing wheel or other focusing element may comprise teeth or grooves to engage an engagement member such as a sprocket. Furthermore, the cross-sectional shape of the engagement members may vary between embodiments of the invention, including circular and otherwise.

FIG. 2b is an exploded view of the focus wheel assembly of FIG. 2a. FIG. 2b shows the focusing wheel 120 apart from the base portion 222, with fasteners 230 shown as being between the base portion 222 and the focusing wheel 120, allowing the focusing wheel 120 to rotate relative to the base portion 222. The O-rings 232 are shown along with attachment members 234, which are adapted to hold the O-rings 232 in place and are themselves secured to the base portion 222 via pins 240. One such attachment member 234 is further adapted with a magnet holder 236 in designed to hold a magnet 238 in place.

Figure 3:
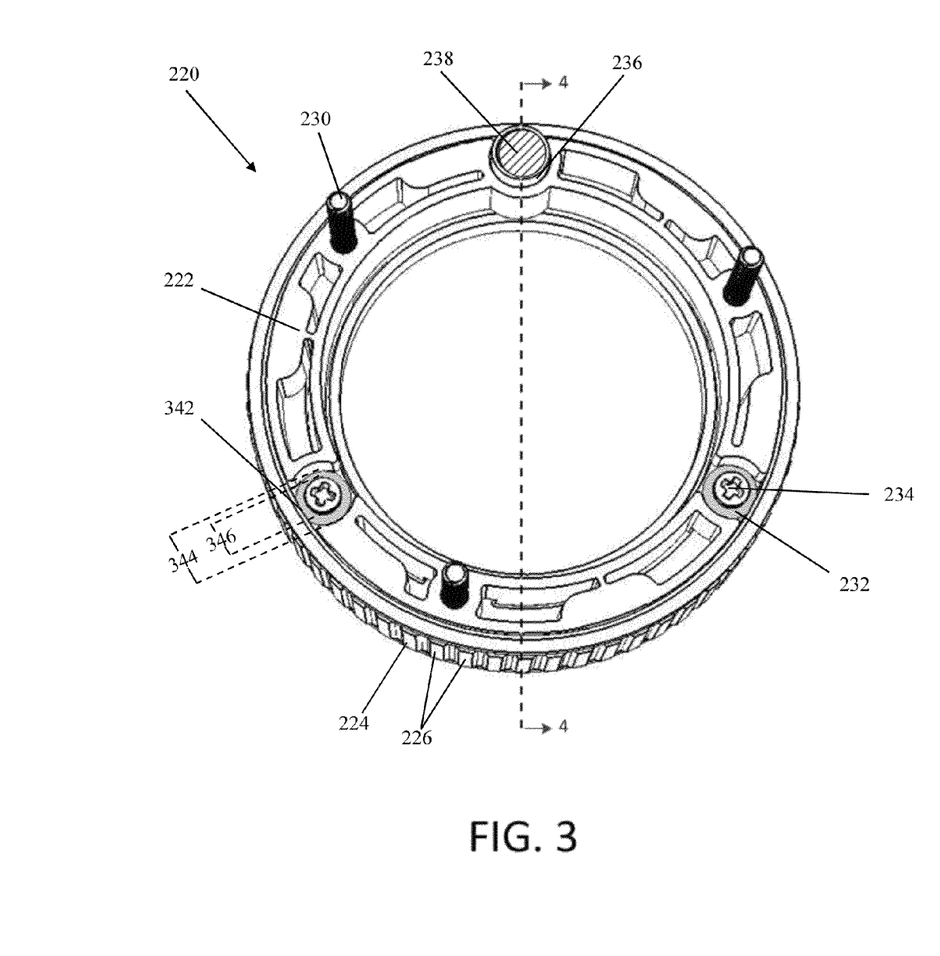
FIG. 3 is a plan view of the back side of an embodiment of the focus wheel assembly.

FIG. 3 is a plan view of the back side of an embodiment of the focus wheel assembly. The focus wheel assembly 220 comprises a base portion 222, through which fasteners 230 extend for securing the assembly 220 to the camera. A focusing wheel 120 is partially seen, and covers the other side of the base portion 222. In some embodiments, the focusing wheel 120 is rotatable about the base portion 222, and is the portion which is handled by a user while manually adjusting the focus. The focusing wheel 120 comprises a grip 224 for facilitating the handling by a user. The grip may comprise ridges 226, as shown in FIG. 2, or may comprise an alternative texture or surface quality. Also visible are O-rings 232, attached to the base portion 222 by attachment members 234. The O-rings 232 engage the interior wall 342 of the focusing wheel 120 and are rotatable about the longitudinal axis of their associated attachment members 234. In some embodiments, the O-rings 232 may rotate about the attachment members 234 themselves. Alternatively, the attachment members 234 may also be rotatable, and further may rotate with the O-rings. For clarity, the O-rings 232 are shaded a light gray, and comprise an inner diameter 346 and an outer diameter 344. The focus wheel assembly 220 of FIG. 3 additionally includes a magnet holder 236 and a magnet 238.

In some embodiments, the force between the O-rings 232 and focusing wheel 120 is such that, as the focusing wheel 120 is rotated, the friction between it and the O-rings 232 does not allow the surfaces to slide along one another, but rather forces the O-rings 232 to rotate as well, as in a planetary gear arrangement. As mentioned previously, the O-rings 232 may rotate about their respective attachment members 234, or may frictionally cause the attachment members 234 to rotate as well. In either case, in order to rotate the focusing wheel 120, the "rolling friction" at least between it and the O-rings 232 must be overcome. That is, a certain amount of torque is necessary to rotate the focusing wheel, preventing it from rotating undesirably on its own. It is noteworthy that "rolling friction" refers generally to the force necessary to overcome to rotate the O-rings by rotating the focus wheel, though there is not necessarily friction that is overcome. Rather, "rolling friction" refers more accurately to the resistance to rolling due to the deformation of the O-ring as it is compressed and relaxed due to the engagement with the focusing wheel. As used throughout this disclosure, rolling friction refers to this force, and is interchangeable with "rolling resistance."

In addition, it is noteworthy that this rolling friction or resistance is present and must be overcome to both initiate and maintain rotation of the focusing wheel 120. Accordingly, the difference in the amount of applied force necessary to begin and to maintain this rotation is reduced, allowing for smoother operation. In some embodiments, this difference may be negligible. In a similar manner, it is preferable that the attachment members 234 associated with each O-ring 232 rotate with each O-ring 232, since otherwise, static friction therebetween must be overcome before the O-rings 232 are allowed to rotate. This static friction would be different from the dynamic friction that will be required to be overcome in order to maintain rotation of the O-rings 232, thus leading to jerky, imprecise operation. Accordingly, the O-rings 232 preferably frictionally engage the attachment members 234 so that as the O-rings 232 are rotated, the frictional force between the O-rings 232 and the attachment members 234 is sufficient to cause them to rotate together without slipping.

However, since the attachment members 234 preferably rotate as the focusing wheel 120 is rotated, and since the focusing wheel 120 is rotatable about the base portion 222 of the assembly 220, the attachment members 234 must rotate as they travel through the base portion 222. In doing so, there is some static friction therebetween that must be overcome in order to begin rotation, and some dynamic friction that opposes rotation during movement. The relationship between these two elements may be configured so as to reduce or minimize both of these frictional forces. It is preferable that, while rotating the focusing wheel 120, the rolling resistance of the O-rings 232 rotating while engaging the focusing wheel 120 is the dominant force overcome by a user at substantially all times of operation. That is, force required to overcome the rolling resistance is preferably much larger than the force to overcome either the static or dynamic friction between the attachment members 234 and the base portion 222. As such, the force required by the user to both initiate and maintain rotation of the focusing wheel 120 will be substantially the same. In some embodiments, the combination of the rolling resistance of the O-rings and static and dynamic friction of the attachment members sufficiently emulate the feel of physically moving camera elements by mechanical means, giving the operator a sense of familiarity and improved control over the system.

Figure 4:
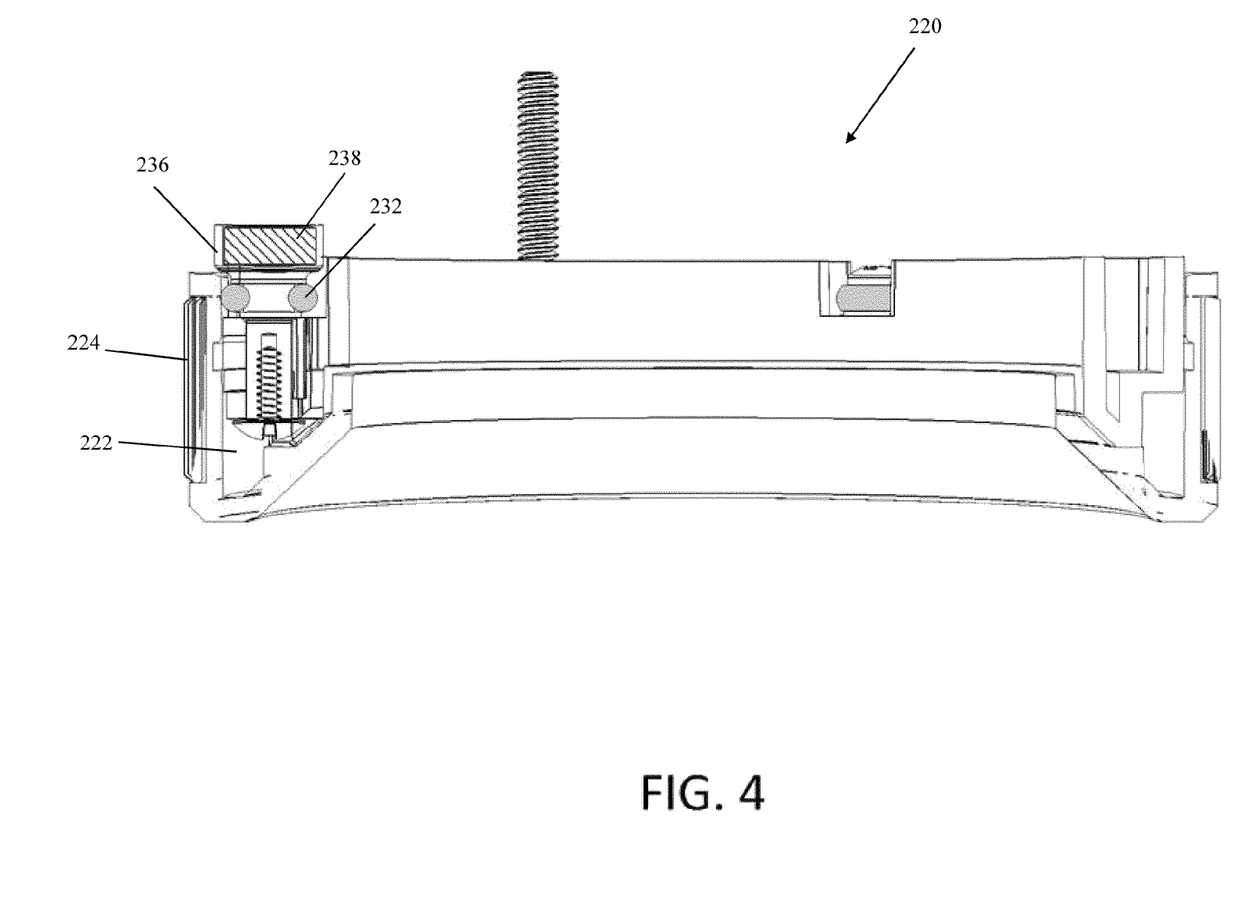
FIG. 4 is a cross-sectional view of FIG. 3, taken at line 4-4.

FIG. 4 is a cross-sectional view of FIG. 3, taken at line 4-4. In this view, an O-ring 232 (shown in light gray) is seen engaging the magnet holder 236 with its inner diameter 346 and engaging the inner surface 342 of the focusing wheel 120 of the assembly 220 with its outer diameter 344. The magnet holder 236 may be holding a magnet 238 in a recess or other holding arrangement. As mentioned previously, the focusing wheel 120 may be rotatable about the base portion 222, and in some embodiments, the magnet holder 236 is also rotatable about its longitudinal axis. Accordingly, the focusing wheel 120, O-ring 232, and magnet holder 236 may be adapted such that, as the focusing wheel 120 is rotated about the base portion 222, the frictional force between it and the O-ring 232 causes the O-ring 232 to rotate, and the engagement of the O-ring 232 to the magnet holder 236 causes the magnet holder 236, which may be holding a magnet 238, to rotate as well.

Thus, in some embodiments, the rotation of the focusing wheel 120 of the assembly 220 may ultimately cause the rotation of a magnet 238 inside the assembly 220. In other embodiment, alternative engagement members may substitute for the mentioned O-rings. For example, the focusing ring may instead engage and rotate a sprocket, which may be coupled to the magnet holder, in which case rotating the focusing ring will cause the sprocket, and also the magnet holder to rotate.

In the embodiment of FIG. 4, the rotation of the focusing wheel 120 causes the rotation of a magnet 238 using rolling instead of sliding parts, thus eliminating the non-uniformity in adjustment associated with the difference between static and dynamic friction. Additionally, the rolling arrangement is such that a sufficient force applied is necessary to initiate and maintain rotation, both for allowing more precise manipulation and holding the rotating elements in place when no external force is applied. Note, also, that if the O-ring were to engage the magnet holder 236 with dynamic friction as opposed to the aforementioned rolling resistance, the rotation of the O-ring 232 would fail to cause the magnet to rotate consistently, as the O-ring 232 would slide about the perimeter of the magnet holder 236 as opposed to securely engaging it.

Figure 5:
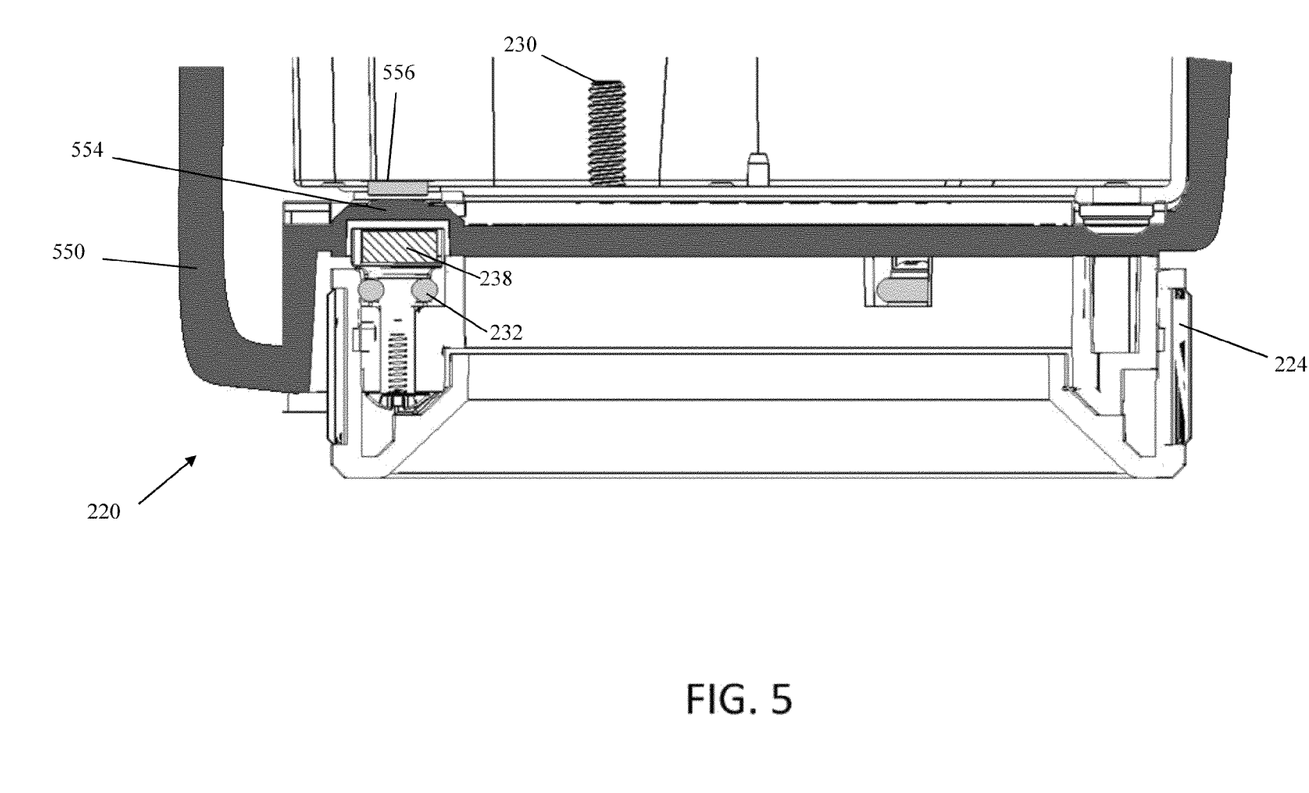
FIG. 5 is a view of the cross sectional view of FIG. 4, operably attached to a camera housing.

FIG. 5 is a view of the cross sectional view of FIG. 4, operably attached to a camera housing. As in FIG. 4, the focus wheel assembly 220 comprises a focusing wheel 120, rotatable about a base portion 222, which is attached to the camera via at least one fastener 230. Focus wheel assembly 220 further comprises O-rings 232 (shown in light gray) engaging the interior wall 342 of the focusing wheel 120 with their outer diameter, one of which additionally engages a magnet holder 236 with its inner diameter 346. The magnet holder 236 is shown holding a magnet 238 (shown as crosshatched) in a recess thereof. In this embodiment, the magnet holder 236 is adapted to rotate via its associated O-ring 232 when the focusing wheel 120 is rotated. In some embodiments, the magnet 238 is arranged such that its north and south poles lie substantially in the plane of interface between the camera 100 and the focus wheel assembly 220, or equivalently, the radial plane of the focus wheel assembly 220 and O-rings 232. In other words, the magnet 238 may be diametrically magnetized.

The camera of FIG. 5 comprises an encoder 556, shown as shaded in a light gray. In some embodiments, the encoder 556 may be adapted to detect magnetic signals, via one or more Hall Effect sensors, for example. The camera also comprises a wall 550 (shown in dark gray) that encloses the encoder 556 inside the camera 100. Advantageously, the wall 550 may be made of the same material as the camera housing 102, and may even be a part thereof, as is shown in FIG. 5. Additionally, the wall 550 may act to seal portions of the interior of the camera from the environment external thereto, protecting vulnerable or sensitive elements inside the camera 100 from dust or other possible contaminants. In this arrangement, the focus wheel assembly 220 is attached to the camera 100 such that the magnet 238 of the focus wheel assembly 220 is proximate the location of the encoder 556 in the camera 100. The wall 550 may comprise a cavity 554 for housing the magnet 238, allowing the magnet 238 to be positioned even closer to the encoder 556.

As discussed in the arrangement of FIG. 5, the rotation of the focusing wheel 120 causes the magnet holder 236, and thus the magnet 238, to rotate about the longitudinal axis of the magnet holder. In certain embodiments, the north and south poles of the magnet 238 lie in the plane of rotation. Therefore, rotation of the magnet 238 causes a change in the magnetic field proximate thereto near the encoder. Accordingly, the encoder 556, if adapted to sense magnetic signals, may determine the relative angular position of the magnet 238. According to some embodiments of the invention, this angular position data is sent to or sampled by a PID controller over time. The PID controller may use this position data, along with the changes in the position data over time, to indicate to the motor to manipulate the position of a focusing component of the camera. A focusing component may refer to any component of the camera that, when moved, may affect the focus of thereof, such as a focusing lens or a light sensor. The PID controller may direct the motor to drive the component a particular distance in a particular direction, to a particular location, or at a particular velocity.

The motor may stop driving the lens when the encoder 556 senses no additional movement of the magnet 238, or if the lens has reached a physical stop, beyond which it is not permitted to travel. In the case of the lens reaching a physical stop, the camera 100 may indicate to the user that the lens is at the end of its focal range, via the display 108, for example. In additional embodiments, the camera 100 may inform the user where along the allowable travel path between physical stops (near focus stop and far focus stop) the lens is currently located. This information may be displayed continuously on the display 108 or may be displayed to the user in response to an inquiry using the user interface 114.

In some alternative embodiments of the invention, the focus wheel may not be freely rotatable, but instead may also comprise physical stops corresponding to the stops of the lens. Elements of the focus wheel assembly may also translate in a direction parallel to the optical axis while rotated, allowing the encoder to possibly differentiate between the same magnet orientations that are some non-zero number of complete revolutions different from one another. Alternatively, a counter element may be included to count revolutions of the focus wheel and make a similar differentiation.

Because of the wall 550 and distance separating the magnet 238 from the encoder 556, it is desirable to have a strong magnet and/or a sensitive encoder to ensure that any movement of the magnet 238 due to user manipulation of the focus wheel assembly 220 is sensed by the encoder 556. Thus, a strong magnet such as one made from rare earth materials, for example neodymium iron boron, may be used. A sensitive encoder presents additional concerns, however, as it may sense undesired signals such as magnetic noise emanating from other components or even the earth's magnetic field. To account for such potential false positives of focus wheel assembly 220 manipulation, a threshold level may be implemented somewhere in the camera (e.g. encoder 556 or otherwise) wherein sensed magnetic signals are not considered movement of the focus wheel assembly unless they are of an appropriate magnitude and/or persist for at least a requisite amount of time. Additionally, for the encoder to accurately sense signals from the magnet while the wall separates the two, the wall cannot not interfere with the magnetic field from the magnet. Thus, in some embodiments it may be advantageous for the wall to comprise a substantially non-magnetic material such as a plastic.

To improve the signal-to-noise threshold and more easily overcome the threshold, some embodiments of the camera comprise a sufficiently high ratio between the diameters of the focusing wheel and the O-ring. For example, the focusing wheel may have a diameter that is roughly ten times that of the O-ring. In such an embodiment, a single revolution of the focusing wheel will result in ten revolutions of the O-ring and thus the magnet held by the magnet holder. Such a large position change of the magnet results in a large signal change from the encoder and thus a large signal in the PID controller. Accordingly, for a given angular manipulation of the focusing wheel, the signal-to-noise ratio in the PID controller is significantly increased as compared to an arrangement with a smaller diameter ratio between the focusing wheel and the O-ring.

Figure 6:
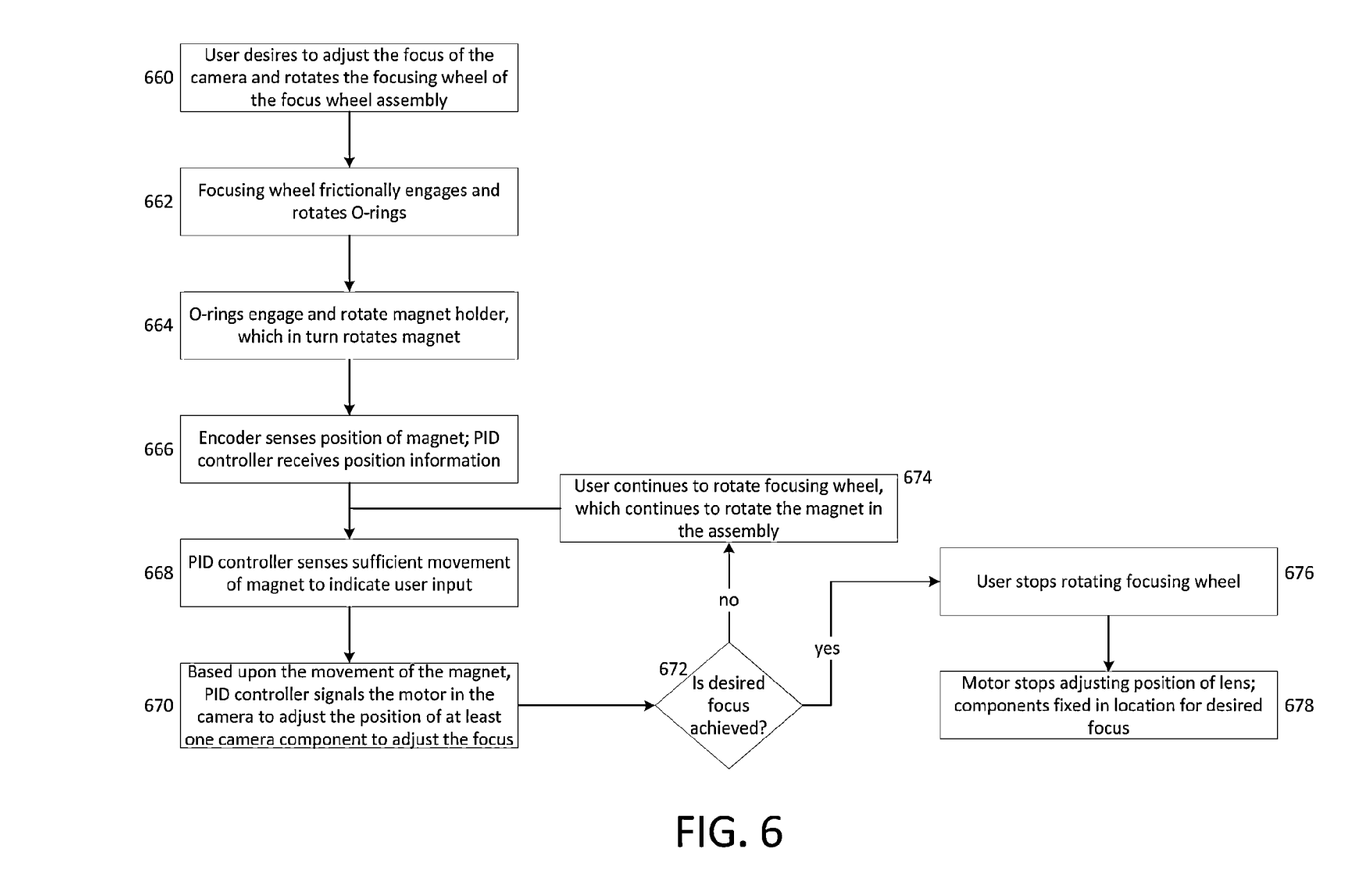
FIG. 6 is a process flow diagram of operation of an embodiment of the invention.

FIG. 6 is a process flow diagram of operation of certain embodiments of the invention. First, a user desires to adjust the focus of the camera, and so rotates 660 the focusing wheel of the focus wheel assembly. The focusing wheel, frictionally engaged 662 to the O-rings, rotates the O-rings. The O-rings, frictionally engaged to the magnet holder, engage and rotate 664 the magnet holder, which in turn rotates the magnet held therein. The encoder senses 666 the magnetic field from the magnet, determining its angular position therefrom, and the PID controller receives the position information from the encoder. In some embodiments, the encoder sends the information to the PID controller. In alternative embodiments, the PID controller may sample the encoder periodically to acquire new position data.

The PID controller receives a series of position information over time, and, if it senses 668 sufficient movement to indicate user input, signals 670 the motor of the camera to adjust the position of at least one camera component in order to adjust the focus. The signal may be based on one or a combination of, among other quantities, the sensed position, the rate of change of the sensed position (i.e. the angular velocity), previous positions of the magnet and other camera parameters. The adjusted camera components may comprise at least a focusing lens and/or the camera's light sensor, such as a focal plane array. Adjusting the position of at least one of these components may comprise moving it with a certain velocity, moving it a certain distance, moving it to a certain position, or some other adjustable position parameter.

The user determines if the desired focus is achieved 672. If not, the user continues 674 to rotate the focusing wheel, which in turn causes the magnet therein to continue rotating as well. Then, as long as the PID controller senses 668 sufficient movement to indicate user input, it signals 670 the motor to adjust the position of a component based upon the movement of the magnet. Once the user determines that the desired focus is achieved 672, the user stops 676 rotating the focusing wheel. Accordingly, the magnet stops rotating and the motor stops 678 adjusting the position of the at least one camera component, which now is fixed in a location for a desired focus.

While configurations comprising magnets and encoders adapted to sense the magnetic field therefrom have been described thus far, it is also within the scope of the invention to include additional arrangements generally involving an indicator element and a sensing element or sensor adapted to interact with one another, sense motion of the focus wheel assembly, and ultimately drive the motor based on the rotation of the focusing wheel. An exemplary configuration may comprise an optical arrangement, wherein an encoder or other optical sensing element detects an optical pattern displayed on an optical indicator element, which is analogous to the magnetic field from the magnet/magnet holder arrangement described above. The optical sensor may detect the position of the optical indicator element due to, for example, a sensed optical pattern. The PID controller may receive this position information in the same ways as described in relation to the encoder above, and can then cause a motor to position a camera component in response to a user rotation of the focusing wheel. In an optical arrangement such as the one described, the wall between the optical indicator and the optical sensor must be optically transmissive to at least a portion of the electromagnetic spectrum. Such optical arrangements may be advantageous in magnetically challenging environments such as areas of large magnetic fields, for example.

In some embodiments, thermal imaging cameras comprise both a manual focus mode, as has been described thus far, and an auto focus mode. In accordance with certain embodiments of the present invention, a camera in auto focus mode may comprise a range finder or distance sensor, such as a laser range finder, which determines the distance from the camera to the target scene. The camera may use this information to drive the lens or the light sensor to an appropriate focusing location based upon the determined distance. Because of the non-physical connection between the focus wheel assembly and the lens or light sensor, the motor may drive one or both of these components in auto focus mode without rotating the focusing wheel of the assembly. Similarly, rotating the focusing wheel while in auto focus mode may not move either of these components. Accordingly, in some embodiments, there is no one-to-one correspondence between the position of the focusing wheel and the position of the lens or light sensor. This physical decoupling of the focusing wheel position and the light sensor advantageously allows a user to seamlessly transition between auto focus mode and manual focus mode at any point during operation.

In the configurations herein described, the focusing wheel of the focus wheel assembly has been coupled to the magnet holder or other indicator element via engagement members such as O-rings. Thus, in such embodiments, the O-rings are adapted to provide the proper amount of friction between themselves and both the focusing wheel and the indicator element. In an exemplary embodiment, the O-rings comprise neoprene, but may comprise other materials that appropriately engage the indicator element and the focus member of the focus wheel assembly. As previously mentioned, alternatives to O-rings may also be used to engage and rotationally couple the focus member and indicator element.

Example thermal image cameras and related techniques have been described. Certain techniques described in this disclosure, such as the translation of the sensed rotation by the encoder to a motor control signal, may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Various examples have been described. These and other examples are within the scope of the following claims.

The invention claimed is:

1. A focus assembly for a camera, the focus assembly comprising:
    a base portion for securing the assembly to the camera;
    a rotatable focus member adjoining the base;
    an indicator element; and
    at least one engagement member coupled to the indicator element and engaging the rotatable focus member such that rotating the rotatable focus member about a first axis causes the at least one engagement member and the indicator element to rotate coaxially about a second axis, the second axis being different from the first.

2. The focus assembly of claim 1, wherein the indicator element comprises a magnet and a magnet holder, configured such that the engagement member engages magnet holder and, when rotated, rotates the magnet holder and the magnet.

3. The focus assembly of claim 2, wherein the magnet is diametrically magnetized.

4. The focus assembly of claim 1, wherein the at least one engagement member engages the rotatable focus member in such a way so that the resistance to initiating and maintaining rotation of the rotatable focus member is substantially the same throughout operation.

5. The focus assembly of claim 1, wherein the rotatable focus member comprises a focusing wheel.

6. The focus assembly of claim 1, wherein the engagement member engages the rotatable focus member with its outer diameter and is coupled to the indicator element with its inner diameter.

7. The focus assembly of claim 1, wherein the at least one engagement member comprises an O-ring, and wherein rotating the rotatable focus member causes the O-ring and the indicator element to rotate due to rolling resistance between the rotatable focus member and the O-ring.

8. The focus assembly of claim 1, wherein the diameter of the focus member is larger than the diameter of the engagement member.

9. The focus assembly of claim 8, wherein the diameter ratio of the focus member and the engagement member is about 10:1.

10. A camera comprising:
    a housing for containing components of the camera;
    a motor;
    a focal plane array;
    a light sensor for sensing electromagnetic radiation;
    a lens for focusing electromagnetic radiation on the light sensor;
    an optical sensor; and
    a focus assembly, the assembly comprising:
        a base member secured to the camera;
        a rotatable focus member adjoining the base; and
        an indicator element; the focus assembly configured such that;
    when rotated, the rotatable focus member causes the indicator element to rotate;
    the optical sensor senses the position of the indicator element; and
    the motor moves of at least one of the lens and the light sensor relative to one another in response to changes in the sensed position.

11. The camera of claim 10, further comprising a wall located between the indicator element and the optical sensor such that the wall creates a seal between the indicator element and the optical sensor.

12. The camera of claim 11, wherein the wall is part of the housing of the camera and the optical sensor is located there within.

13. The camera of claim 12, wherein the wall comprises a cavity for receiving at least a portion of the indicator element.

14. The camera of claim 10, further comprising at least one physical stop that limits the traversable distance of at least one of the lens and the light sensor.

15. The camera of claim 14, further comprising a display and configured such that the display may indicate to a user the position of at least one of the lens and the light sensor relative to their respective at least one physical stop.

16. The camera of claim 10, wherein the rotatable focus member comprises a focusing wheel.

17. The camera of claim 10, wherein the camera is a thermal imaging camera.

18. The thermal imaging camera of claim 17, wherein the light sensor comprises an infrared radiation sensor and the lens comprises an infrared lens.

19. The camera of claim 10, further comprising an auto focus mode, wherein the position of at least one of the lens and the light sensor is adjusted automatically by the camera without manipulation of the focus assembly by the user.

20. The camera of claim 19, wherein the user may transition between auto focus and manual focus modes at any point during operation.

21. The camera of claim 10, further comprising a PID controller, configured to receive data corresponding to the sensed position of the indicator element and to instruct the motor to move at least one of the light sensor and the lens based on changes in the sensed position.

22. The camera of claim 21, wherein the PID controller samples data from the optical sensor corresponding to the position of the indicator element.

23. The camera of claim 10, wherein the motor is a piezoelectric motor.

24. A method for changing the focus of a camera, the camera comprising a motor, a lens, and a light sensor; and wherein at least one of the lens and the light sensor is positionable by the motor; the method comprising:
  rotating a rotatable focus member about a first axis, the rotatable focus member engaging at least one engagement member and the engagement member engaging at least one indicator element such that rotating the rotatable focus member about the first axis causes the indicator element to rotate about a second axis separate from the first;
  sensing, by a sensing element, the position of the indicator element;
  comparing changes in the sensed position to a threshold level; and
  in the event that the changes in the sensed position meet the threshold level; driving at least one of the lens and the light sensor with the motor in response to changes in the sensed position of the indicator element in order to change the focus of the camera.

25. The method of claim 24 wherein the sensed position is received by a PID controller, which instructs the motor to drive at least one of the lens and the light sensor based at least on changes in the sensed position.

26. The method of claim 24, wherein the position of the indicator element is sensed by the sensing element through a wall enclosing the sensing element in the body of the camera.

27. The method of claim 24, wherein the indicator element comprises a magnet holder and a magnet held therein.

28. The method of claim 27, wherein the sensing element is configured to sense magnetic signals.

29. The method of claim 24, wherein the indicator element comprises an optical indicator.

30. A focus assembly for a camera, the focus assembly comprising:
  a base portion for securing the assembly to the camera;
  a rotatable focus member adjoining the base;
  an indicator element; and
  at least one engagement member coupled to the indicator element and engaging the rotatable focus member such that rotating the rotatable focus member causes the at least one engagement member and the indicator element to rotate; and wherein
  the at least one engagement member engages the rotatable focus member in such a way so that the resistance to initiating and maintaining rotation of the rotatable focus member is substantially the same throughout operation.

* * * * *